US010546611B2

(12) United States Patent
Riedel et al.

(10) Patent No.: US 10,546,611 B2
(45) Date of Patent: *Jan. 28, 2020

(54) SYSTEM AND METHOD FOR TIME DELAYED PLAYBACK

(71) Applicant: Viacom International Inc., New York, NY (US)

(72) Inventors: Gregg William Riedel, New York, NY (US); Jeff Hess, New York, NY (US); Scott Danahy, New York, NY (US)

(73) Assignee: Viacom International Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/981,539

(22) Filed: May 16, 2018

(65) Prior Publication Data

US 2018/0261250 A1      Sep. 13, 2018

Related U.S. Application Data

(63) Continuation of application No. 14/502,998, filed on Sep. 30, 2014, now Pat. No. 10,002,638.

(51) Int. Cl.
*G11B 27/031* (2006.01)
*G11B 27/10* (2006.01)
(Continued)

(52) U.S. Cl.
CPC .......... *G11B 27/031* (2013.01); *G11B 27/105* (2013.01); *G11B 27/36* (2013.01); *H04N 5/76* (2013.01); *H04N 21/6375* (2013.01)

(58) Field of Classification Search
CPC ........ G11B 27/105; G11B 27/36; H04N 5/76; H04N 21/6375
See application file for complete search history.

(56) References Cited

U.S. PATENT DOCUMENTS 8,141,113 B2   3/2012  Bassali et al.
2003/0046633 A1*  3/2003  Jutzi ................ H04L 1/0041
                                                    714/774
(Continued)

FOREIGN PATENT DOCUMENTS

CN    1291842      4/2001
CN    1859564     11/2006
(Continued)

*Primary Examiner* — Thai Q Tran
*Assistant Examiner* — Sunghyoun Park
(74) *Attorney, Agent, or Firm* — Fay Kaplun & Marcin, LLP

(57) ABSTRACT

A system and method that time delays a playback from a first feed at a first time to a second feed at a second time. The method includes recording the first feed that is received at the first time to be used at least partially as a playback of the second feed at the second time. The second time has a predetermined delay relative to the first time. The method includes determining whether the first feed has a discrepancy in the actual playback from a desired playback. The discrepancy is at a known time and lasting a known time amount. The method includes transmitting the playback to the second feed after the predetermined delay. A fix is aired instead of the playback for the known time amount corresponding to the discrepancy.

20 Claims, 6 Drawing Sheets

(51) Int. Cl.
    *H04N 21/6375*    (2011.01)
    *H04N 5/76*    (2006.01)
    *G11B 27/36*    (2006.01)

(56) References Cited

U.S. PATENT DOCUMENTS

| | | | | |
|---|---|---|---|---|
| 2005/0182995 | A1* | 8/2005 | Curcio | H04L 1/1809 |
| | | | | 714/748 |
| 2006/0018489 | A1 | 1/2006 | Piazza | |
| 2006/0095943 | A1* | 5/2006 | Demircin | H04N 21/2365 |
| | | | | 725/81 |
| 2008/0273554 | A1* | 11/2008 | Shao | H04N 21/262 |
| | | | | 370/498 |
| 2008/0310297 | A1* | 12/2008 | Murakami | G06F 11/10 |
| | | | | 370/216 |
| 2010/0125768 | A1* | 5/2010 | Mauchly | H04L 1/1829 |
| | | | | 714/749 |
| 2011/0246845 | A1* | 10/2011 | Hannuksela | H04L 1/0077 |
| | | | | 714/746 |
| 2013/0242189 | A1 | 9/2013 | Babu et al. | |
| 2013/0254611 | A1* | 9/2013 | Amerga | H04N 19/895 |
| | | | | 714/746 |
| 2013/0315139 | A1* | 11/2013 | Abraham | H04B 7/0452 |
| | | | | 370/328 |

FOREIGN PATENT DOCUMENTS

| | | |
|---|---|---|
| CN | 101228748 | 7/2008 |
| CN | 10184169 | 9/2010 |
| CN | 102790911 | 11/2012 |

* cited by examiner

SYSTEM AND METHOD FOR TIME DELAYED PLAYBACK

PRIORITY INFORMATION

The present application is a Continuation Application of U.S. patent application Ser. No. 14/502,998 filed on Sep. 30, 2014 entitled "System and Method for Time Delayed Playback", now U.S. Pat. No. 10,002,638. This application also relates to U.S. patent application Ser. No. 14/503,050 filed on Sep. 30, 2014. The entire disclosure of these prior applications/patents are considered as being part of the disclosure of the accompanying application and hereby expressly incorporated by reference herein.

BACKGROUND INFORMATION

A program may be broadcast to viewers in a variety of different manners. For example, a television network may broadcast different programs throughout a broadcast day. In other examples, a web site, a mobile video provider, etc. may also broadcast programs at select times during a day. With particular regard to television programs, the television network may be a national network or may be affiliated with other television networks such that the programs may be aired in different areas, most particularly in areas having different time zones. Depending on a variety of reasons such as the type of program, it may be aired in a variety of different ways. For example, the programs may include live events such as a sporting event or a concert. When a live event is aired, it may be aired concurrently throughout the different time zones. Thus, the live event may be aired in the Eastern time zone at 8:00 pm and in the Pacific time zone at the corresponding 5:00 pm. In another example, the programs may include pre-recorded shows such as reality shows, game shows or scripted shows (e.g., dramas, sitcoms, etc.). When a pre-recorded show is aired, it may be aired at common times in the different time zones. Thus, the pre-recorded show may be aired in the Eastern time zone at 8:00 pm and in the Pacific time zone at 8:00 pm as well (which corresponds to 11:00 pm in the Eastern time zone).

A time delayed playback (TDP) system is configured for airing a show with at least some time delay. For example, in the above described latter scenario, the TDP system may air a show at a first time in a first time zone and a subsequent airing at a second time in a second time zone. Most notably, in the United States, the TDP system may receive a feed for an Eastern time zone at the time the feed is aired in the Eastern time zone, store the feed, and subsequently transmit the recorded feed for playback in the Pacific time zone. In another example, in the above described prior scenario, a live feed may be delayed for at least one second for quality control purposes such as a profanity delay. Thus, the live feed may also be "pre-recorded" and played at the predetermined time delay period. However, the TDP system may succumb to a variety of issues since the integrity of the recorded feed determines the integrity of the playback feed. In a first example, there may be a discrepancy or failure in the feed being recorded such as a commercial failing to play out. In a second example, there may be a discrepancy in the recording device itself that causes at least some of the feed data to be missing.

DETAILED DESCRIPTION

Figure 1:
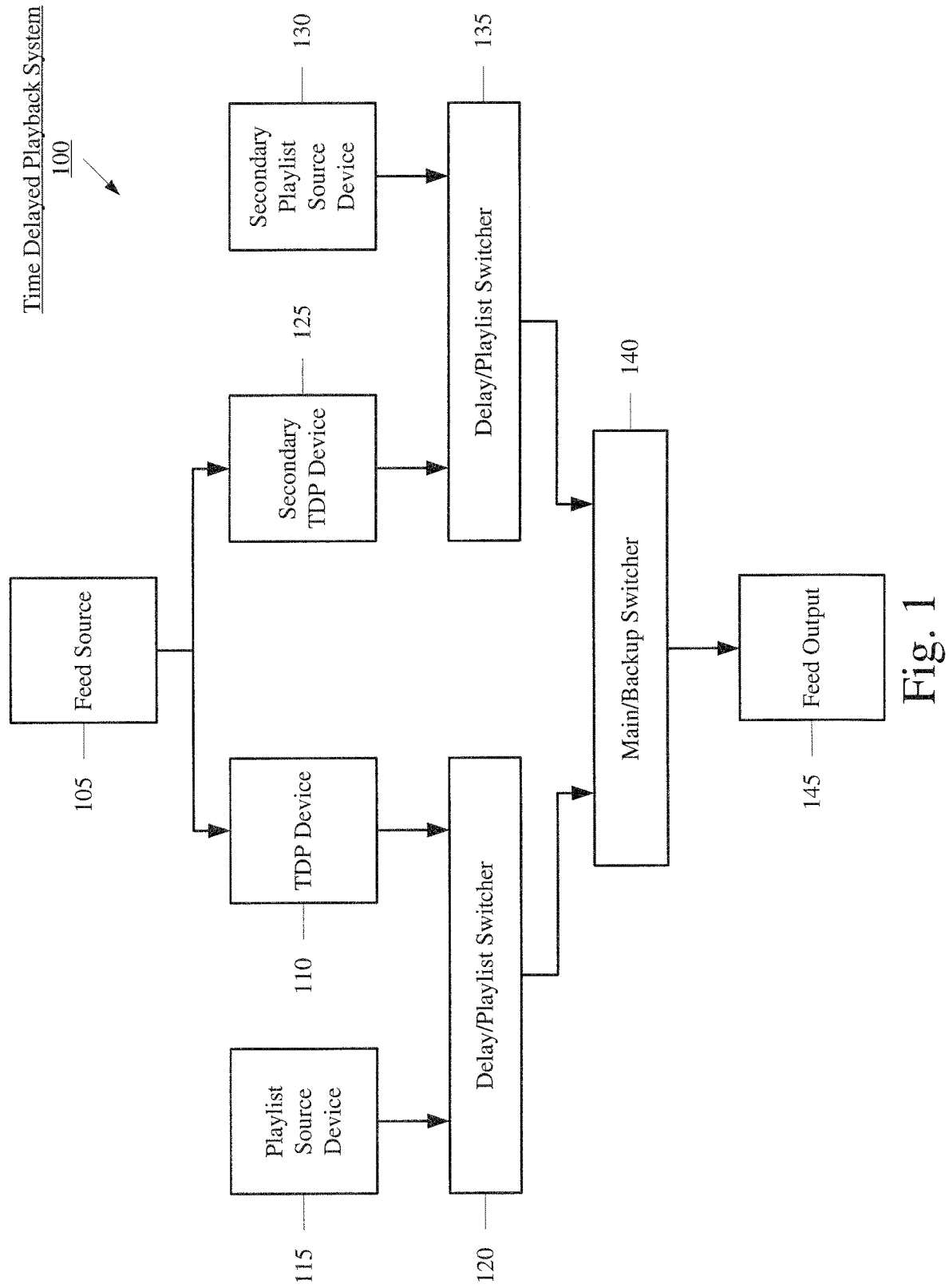
FIG. 1 shows an exemplary time delayed playback system according to the exemplary embodiments.

The exemplary embodiments may be further understood with reference to the following description and the related appended drawings, wherein like elements are provided with the same reference numerals. The exemplary embodiments are related to a system and method for a time delayed playback (TDP) in which a feed that is aired at a first time is recorded for a subsequent playback at a second time. Specifically, the exemplary embodiments provide a TDP system that addresses issues raised from using a recorded feed as a basis for a playback feed that is delayed by some amount of time. For example, the TDP system of the exemplary embodiments may provide a more efficient fix for issues occurring in the recording. In another example, the TDP system of the exemplary embodiments may provide a more useful fix for issues occurring in the devices themselves.

The exemplary embodiments relate to any delayed playback based upon some amount of time. For illustrative purposes, the exemplary embodiments herein are described related particularly to a time zone delay. However, the use of the time zone delay is only exemplary. Those skilled in the art will understand that the TDP system of the exemplary embodiments may be applied to any time delayed playback. For example, a television network may have a recorded feed of a live event with at least a one second delay for a playback feed, the time delay being used to censor any profanity such that the playback feed includes the censored portions. In another example, a web site may have a recorded feed of an event with at least some time delay for a playback feed, the time delay being used for profanity issues, for formatting issues (e.g., from the recorded feed format to the playback feed format), etc.

The world has a plurality of time zones. Specifically, the contiguous United States has four time zones geographically adjacent one another including (from east to west) an Eastern time zone, a Central Time Zone, a Mountain Time Zone, and a Pacific Time Zone. Generally, the Eastern time zone is one hour ahead of the Central time zone; the Central time zone is one hour ahead of the Mountain time zone; and the Mountain time zone is one hour ahead of the Pacific Time Zone. Thus, the Eastern time zone is three hours ahead of the Pacific time zone. In view of these time zones, nationwide broadcast television networks and cable/satellite channels (collectively referred to herein as "broadcasters") generally broadcast a first east coast feed that is aired simultaneously in the Eastern and Central time zones and a second west coast feed that is aired in the Pacific time zone. The broadcasters may utilize a TDP system that is configured for the west coast feed to air a recorded playback feed. Specifically, the TDP system records the east coast feed such that the west coast feed is a tape-delayed playback by three hours. This may be used so that a broadcast that airs, for example, at 8:00 p.m. in the Eastern time zone is also shown locally at 8:00 p.m. in the Pacific time zone.

The following description relates to using the TDP system to record an east coast feed and playing back the recorded east coast feed as a west coast feed. However, as described above, it should again be noted that those skilled in the art will understand that the exemplary embodiments may be used for other time shifts such as profanity screening delays. In another example, the broadcasters may broadcast programs in the Mountain time zone. In a first example, the broadcasters may broadcast a third feed specifically for the Mountain time zone. Specifically, the broadcasters may again utilize a recorded playback from the TDP system. In this example, the Mountain time zone playback is delayed by two hours from the Eastern time zone. In a second example, the broadcasters may use the west coast feed for the Pacific time zone as well as for the Mountain time zone. As will be described in further detail below, the exemplary embodiments may be used in any of these scenarios. More generally, the exemplary TDP system may be used for any scenario in which the broadcaster desires to transmit a previously recorded broadcast. Thus, it should be understood that the use of an east coast feed and a west coast feed is only exemplary. More generally, the TDP system may be used for other time zones outside the United States such as EMEA (Europe, Middle East, and Africa) as well as Asia.

When functioning as intended with the east coast feed not including any issues, the TDP system may record the east coast feed exactly as aired and use the recording as the playback for the west coast feed. Those skilled in the art will understand that this ideal situation does not always occur and that various issues may arise in the feed that is recorded as well as in the components of the TDP system. Specifically, the TDP system according to the exemplary embodiments is configured to address issues when the east coast feed requires a fix prior to utilizing a playback for the west coast feed and issues when a component in the TDP system has a problem that may prevent a complete recording to take place. More generally, the TDP system of the exemplary embodiments is configured to address issues from a recorded feed at a first time used for a playback feed at a second time subsequent to the first time.

FIG. 1 shows an exemplary TDP system 100 according to the exemplary embodiments. As described above, when no issues arise in the feed being recorded or in the components being used, the TDP system 100 may receive an east coast feed to be recorded (i.e., a recorded feed) for a subsequent playback as the west coast feed (i.e., a playback feed). Thus, the TDP system 100 may include a feed source 105, a TDP device 110, and a feed output 145.

Initially, it should be noted that the TDP system 100 being represented as a plurality of different devices interconnected among each other is only exemplary. Those skilled in the art will understand that the TDP system 100 may also be represented as a single device that is capable of performing the functionalities as described herein for all the different components.

The feed source 105 may be any broadcasting device that transmits a program for the east coast feed. For example, the feed source 105 may be operated by a nationwide network that pre-records original programming. Typically, a broadcaster operates the feed source 105 and transmits the feed to providers (e.g., cable operators, satellite operators, etc.) that then re-transmit the feed to their customers (e.g., viewers). In this example, the transmission to the providers is shown as the feed output 145. The feed output 145 may be, for example, a satellite transmitter that transmits the feed, a device that transmits the feed via cables, etc. In this example, the feed output 145 receives the content to be transmitted from the TDP device 110 or the secondary TDP device 125 via a delay/playlist switcher (hereinafter "delay switcher") 120, 135, respectively. However, it should be noted that the feed source 105 could directly feed the feed output 145 and the TDP arrangement could be set up in parallel (e.g., the output of the feed source 105 could be split to directly feed each of the feed output 145, TDP device 110 and secondary TDP device 125).

In the arrangement of FIG. 1, the feed source 105 output (e.g., the east coast feed) is also received by the TDP device 110 and the secondary TDP device 125. Each of these devices 110 and 125 record the feed source 105 output. That is, the TDP devices 110, 125 generate a recorded feed from the feed source 105. The reasons for having two TDP devices 110 and 125 will be described in greater detail below, but it may be generally described as relating to errors that occur within the TDP devices, rather than errors that occur within the feed. Subsequently, when it is time to provide the west coast feed, one of the TDP devices 110 or 125 provide the recorded east coast feed to the feed output 145 that is provided to the providers. That is, the TDP devices 110, 125 utilize the recorded feed to provide the playback feed for the feed output 145. As described above, if there are no issues with the east coast feed (e.g., the program plays out with no stops or freezes, all commercials are aired at the correct time within the program, etc.), then the TDP devices 110 or 125 provide the recorded east coast feed to the feed output 145 as the west coast feed, which is then provided to the providers.

Prior to describing further operation of the TDP system 100 overall, the TDP device 110 will be described. It should also be noted that the secondary TDP device 125 may include similar components and functionality. The TDP device 110 may be embodied in a variety of manners. For example, the TDP device 110 may be any electronic device configured to perform the functionalities described herein. The TDP device 110 may include hardware and/or software components. For example, the TDP device 110 may include a processor, a memory arrangement, a display device, input/output (I/O) devices, etc.

The processor may be configured to execute a plurality of applications corresponding to the described functionalities. It should be noted that the applications may be embodied as executable programs that are executed by the processor and cause the processor to perform the functionalities. However, this is only exemplary and the functionalities associated with the applications may also be represented as separate incorporated components of the TDP device 110 (e.g., an integrated circuit with or without firmware), may be a modular component coupled to the TDP device 110 (e.g., a hardware or software plug-in), or a combination thereof.

The memory arrangement may be a hardware component configured to store data related to operations performed by the TDP device 110. For example, a memory device (e.g., hard drive, tape drive, flash memory, etc.) included in the TDP device 110 or to which the TDP device has access, may store the feed as a recording for the playback. The display device may be a hardware component configured to show information or interfaces to a user while the I/O devices may be hardware and/or software components configured to receive inputs from a user and output corresponding data. Specifically, the display device and the I/O devices may enable the user to provide corresponding information for certain functionalities. The I/O devices may also enable the TDP device 110 to receive the feed from the feed source 105 and transmit the playback to the feed output 115.

The TDP system 100 may further include a playlist source device 115 and the delay switcher 120. As will be described in greater detail below, the feed that is recorded (e.g., the east coast feed) may include errors or issues. According to the exemplary embodiments, the playlist source device 115 may be configured to provide a fix for each error or issue determined in the recorded feed received from the feed source 105. The playlist source device 115 may include similar components as were described above for the TDP device 110.

The issues or errors that may arise from the feed source 105 and the recorded feed received from the feed source 105 may include many different kinds of discrepancies from an ideal desired playback. One particular issue that broadcasters wish to address prior to airing the recorded playback in the west coast feed is when the east coast feed has a commercial or advertisement failing to play out. Those skilled in the art will understand that commercials that are played during a broadcast provide revenue for each time the commercial is played out. Thus, when a commercial fails to play out, the broadcaster may not receive the expected revenue from the commercial play out. Thus, if a commercial fails to play out in the east coast feed, the commercial will again fail to play out on the west coast feed if no corrective action is taken. This is clearly not desirable as all the revenue for both the east coast feed and west coast feed will be foregone.

Therefore, a broadcaster wishes to fix the west coast feed so that the commercial plays out to preserve some of the attached revenue gained from playing the commercial. The exemplary embodiments provide an efficient fix mechanism to address this type of issue. In the examples provided, it will be considered that the identified issue is the non-playout of a commercial. However, those skilled in the art will understand that other issues and errors (e.g., an audiovisual problem, a content problem, etc. related to commercials, promos, bumpers, programming segments, etc.) in the feed (e.g., constrained to a single piece of content or spanning multiple minutes/hours of programming) may also be identified and corrected in accordance with the examples provided herein.

Initially, the error in the east coast feed needs to be identified. One manner of identifying errors is a manual identification by a user (e.g., an employee of the broadcaster may be tasked with monitoring one or more feeds to identify errors). This employee may record the error and when the error in the feed occurs. For example, the current program that is being aired in the east coast may run from 8:00-9:00 pm. The commercial that did not air properly, may be a 60 second commercial that was scheduled to air from 8:21-8:22. The employee may record this information for use in fixing the west coast feed.

There may also be automatic approaches of determining that an error has occurred. For example, the TDP device 110, the playlist source device 115 or some other device, may monitor the feed and automatically identify errors or issues within the feed. In one example, it may be automatically determined that there is a predetermined number of consecutive frames that indicate a downtime in which nothing is being shown or an error has occurred. For example, the frames may indicate a black screen or a constant image. The predetermined number of consecutive frames may be a threshold value in which the black screen or constant image is being shown beyond an acceptable time limit and this may be identified as an error. Similar to the manually identified error, the error and the time of occurrence may be recorded. If the playlist source device 115 is configured for this functionality, the playlist source device 115 may also receive the recorded feed from the feed source 105 or the TDP device 110.

According to the exemplary embodiments, upon detection of an issue in the feed received from the feed source 105, the playlist source device 115 may receive an input for a fix to the discrepancy. In a first manner of providing the input for the fix, a user may receive an indication of the issue of the failed commercial (e.g., from an automatic determination by the system 100 or from a manual determination) and determine that the time slot in the recorded feed that the commercial failed is to be replaced with a full run of the commercial. To continue with the example started above, the commercial may have been scheduled to run for 60 seconds in the east coast feed but due to an issue, the commercial may not have played out properly.

In one example, the user may enter a command to the playlist source device 115 to play the commercial on the west coast feed at the corresponding time. In this way, the west coast feed may succeed in playing out the commercial. Therefore, the broadcaster may receive the revenue at least for the run in the west coast feed.

In a second example, the playlist source device 115 may automatically determine the fix. Specifically, the playlist source device 115 may be pre-programmed to determine the fix based upon the circumstances surrounding the issue. Initially, the pre-recorded program that is aired in the east coast feed may have associated information (e.g., metadata). This associated information may include, for example, an identification of the pre-recorded program that is airing, the times of the commercial breaks, an identification of the commercials that are scheduled in each of the breaks, etc. The playlist source device 115 may be provided with this associated information. Using the above scenario of the 60 second commercial failing to play out, the playlist source device 115 may receive the indication of the error and the time at which the error occurred, e.g., incorrect playout from 8:21-8:22. After receiving the identification of the issue, the playlist source device 115 may determine the fix. For example, based upon the associated information, the playlist source device 115 may identify which commercial failed to play out. The playlist source device 115 may retrieve this commercial from a playlist database (not shown) and insert the commercial at the correct location. An exemplary manner of inserting the commercial into the west coast feed will be described in detail below. In this manner, the fix to the west coast feed may be applied.

As described above, the commercial itself may be required to be available to the playlist source device 115. The playlist database may include a copy of each commercial based upon what is included in the associated information. Thus, the playlist source device 115 may retrieve the data for the failed commercial from the playlist database. The playlist database may also store the associated information for reference by the playlist source device 115. The playlist database may represent any storage device that stores the information to be used by the playlist source device 115. In this manner, the playlist database may generally represent any source in which the information may be retrieved.

It should be noted that the above description relating to fixing a commercial failure is only exemplary. Those skilled in the art will appreciate that the fix may also be for the program itself or any other interstitial content. For example, due to an unforeseen error, the program in the east coast feed may have failed. Although fixed at a later time for the east coast feed using manners known in the art, the recorded playback feed by the TDP device 110 may include a gap in which the program is not played as intended. The playlist source device 115 may also provide a fix in which the program may be available and a fix is provided such that the west coast feed plays the program as intended without the gap that existed in the east coast feed.

Figure 2:
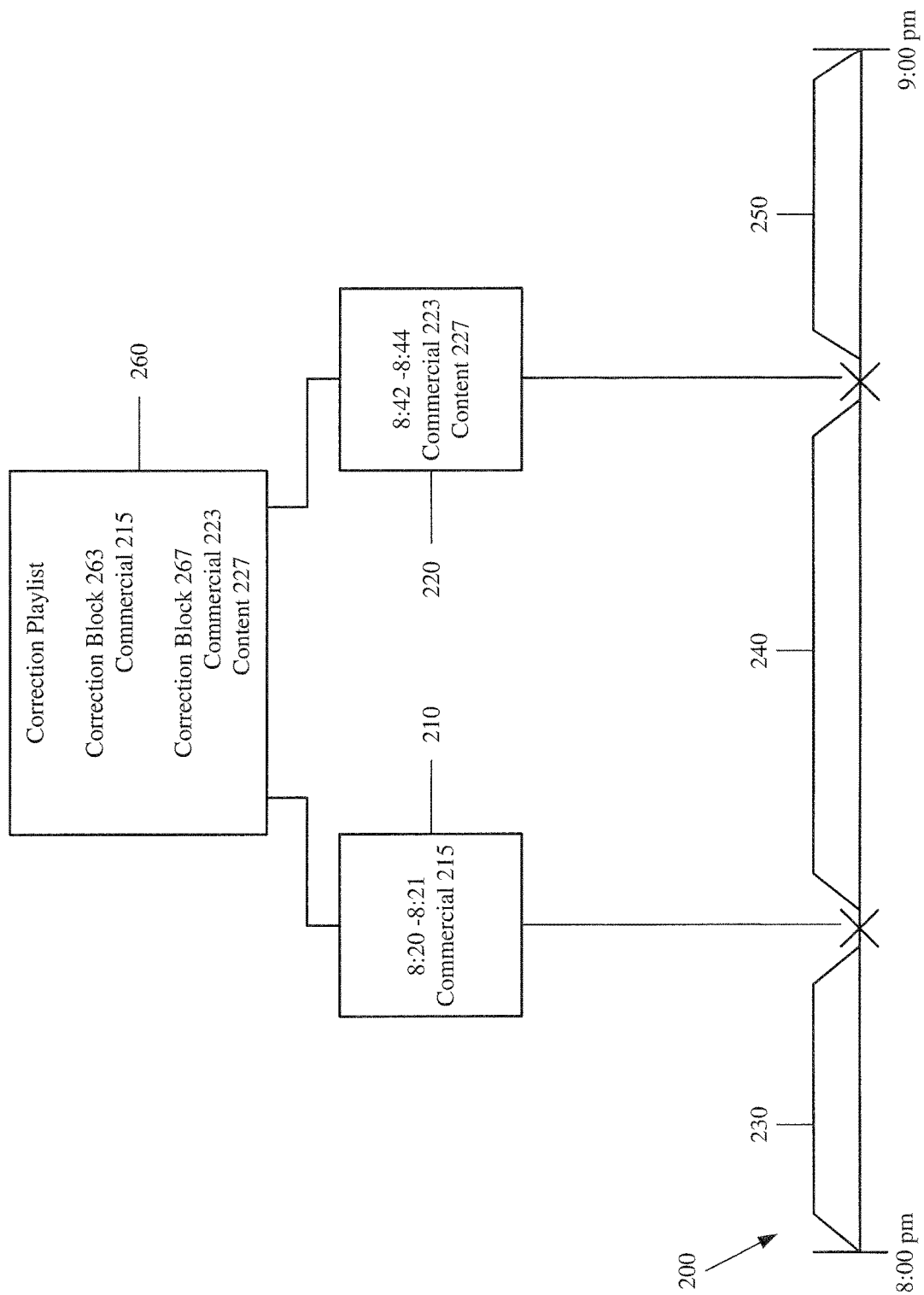
FIG. 2 shows a timeline of a recorded feed that includes identified errors.

The mechanism for which the fix is applied to the west coast feed provided to the feed output 145 may be performed in a variety of manners. The following example is used to illustrate how the fixes to the west coast feed may be applied. FIG. 2 illustrates a timeline 200 of a recording of an east coast feed (i.e., a recorded feed) that includes identified errors. The timeline 200 shows that the east coast feed was recorded from 8:00 pm-9:00 pm. During the recording, two errors 210 and 220 were identified. Exemplary manners of identifying the errors 210 and 220 were described above. In this example, it may be considered that error 210 occurred from 8:20-8:21 pm and error 220 occurred from 8:42-8:44 pm in the recording of the east coast feed. Thus, this means that conceptually, the portions of the east coast feed that are acceptable may be labeled as recorded block 230 (8:00-8:20), recorded block 240 (8:21-8:42) and recorded block 250 (8:44-9:00). To correct the west coast feed, the portions of the recording corresponding to the errors 210 and 220 are to be replaced with the correct feed. In this example, it may also be considered that the errors have been identified as follows: error 210 corresponds to a missing commercial 215; and error 220 corresponds to a missing commercial 223 and missing content 227.

Using this identified error information, the playlist source device 115 may build a correction playlist 260. Exemplary manners of building the correction playlist 260 have been described above. In this example, the correction playlist 260 includes a correction block 263 and a correction block 267. The correction block 263 includes the commercial 215 that did not play out correctly and is identified as error 210. The correction block 267 includes the commercial 223 and the content 227 that did not play out correctly and were identified as error 220. It should be noted that content 227 refers to a portion of the pre-recorded program that did not play out correctly in the east coast feed. It should also be noted that the example of error 220 shows an example of two different types of content (commercial and pre-recorded show) that are contiguous and did not play out correctly. Thus, the correction block 267 for the error 220 includes multiple items in the correction playlist 260. It should further be noted that the use of two separate correction blocks 263, 267 is only exemplary. At an operator's discretion or other criteria, the corrections may be consolidated into a single correction block spanning a time from a start time of the first error to an end time of the last error. In this example, the single correction block may span from 8:20-8:44 pm. This single correction block may also include the commercial 215, the recorded block 240, the commercial 223, and the content 227.

Figure 3:
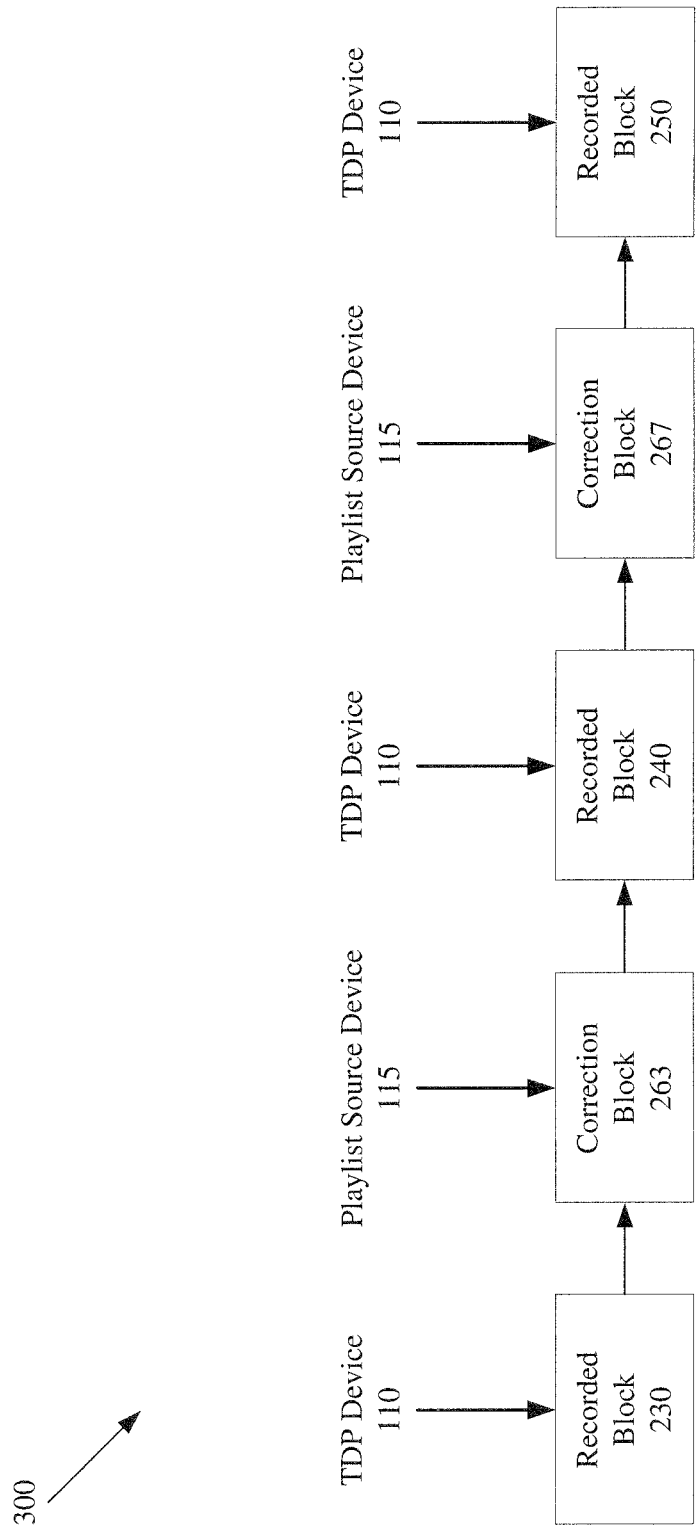
FIG. 3 shows an exemplary play out order for a playback feed based on the recorded feed of FIG. 2.

FIG. 3 shows an exemplary play out order 300 for the west coast feed based on the recorded east coast feed of FIG. 2. The exemplary play out order 300 will be described with reference to the TDP system 100 of FIG. 1 and the exemplary recording of the east coast feed of FIG. 2. When it is time to play out the west coast feed (i.e., the playback feed), one of the TDP devices 110 or 125 will start outputting the recorded east coast feed to the feed output 145 (throughout the remainder of this example, it will be assumed that the TDP device 110 is the device outputting the recorded feed). Thus, the TDP device 110 outputs recorded block 230 to the feed output 145 as shown in FIG. 3. This outputting continues until error 210 is encountered. At that time, the playlist source device 115 outputs the correction block 263 (e.g., commercial 215) to the feed output 145 as also shown in FIG. 3.

Thus, it may be considered that the output of the playlist source device 115 overrides the output of the TDP device 110. This override may be accomplished in a variety of manners. For example, the delay switcher 120 that receives the outputs of the TDP device 110 and the playlist source device 115 may include logic that indicates that the TDP device 110 recording is to be interrupted whenever there is content received from the playlist source device 115. This logic may also be incorporated into the feed output 145. However, it should again be noted that the TDP device 110, the playlist source device 115, and the delay switcher 120 being separate components is only exemplary. In other embodiments, these components may be incorporated into a single device. It should also be noted that the delay switcher 135 may perform substantially similar functionalities with regard to the secondary TDP device 125 and the secondary playlist source device 130.

In another example, the playlist source device 115 may output the correction block based on the information associated with the error. For example, the error 210 is identified as occurring from 8:20-8:21 pm. At this time during the west coast feed, the playlist source device 115 may begin playing the correction block 263 and the TDP device 110 may be signaled to stop playing out during this time. In a further example, the playlist source device 115 may monitor the west coast feed and when an error is identified (e.g., too many black frames), the playlist source device 115 may begin playing out the next available correction block (e.g., correction block 263).

When the play out of the correction block 263 is completed, the output of the TDP device 110 may again be the output corresponding to the west coast feed. In this example, the TDP device 110 will output recorded block 240 as shown in FIG. 3. Again, during the time of the play out of correction block 263, the TDP device 110 may continue to output the error portion of the recording, but it is ignored by the delay switcher 120, or the TDP device 110 output may be turned off and resumed when the correction block 263 is played out.

The play out order 300 of FIG. 3 continues until the error 220 is encountered. At this point, the playlist source device 115 will output the correction block 267 that includes both the commercial 223 and the portion of the content 227 that did not play out correctly in the east coast feed. The playlist source device 115 will first play out the commercial 223. Then, instead of the west coast feed reverting back to the TDP device 110 recording, the playlist source device 120 will also play out the content 227. Thus, when an individual correction block begins being played out, all the items identified in that correction block (e.g., commercial 223, content 227) will play out prior to reverting to the recording of the TDP device.

When the correction block 267 is completely played out, the west coast feed as shown in the play out order 300 will revert to the TDP device 110 outputting block 250. When the block 250 is completed, the west coast feed for the 8:00 pm-9:00 pm time frame is complete and correct because the errors 210 and 220 that occurred in the east coast feed have been corrected in the west coast feed.

Figure 4:
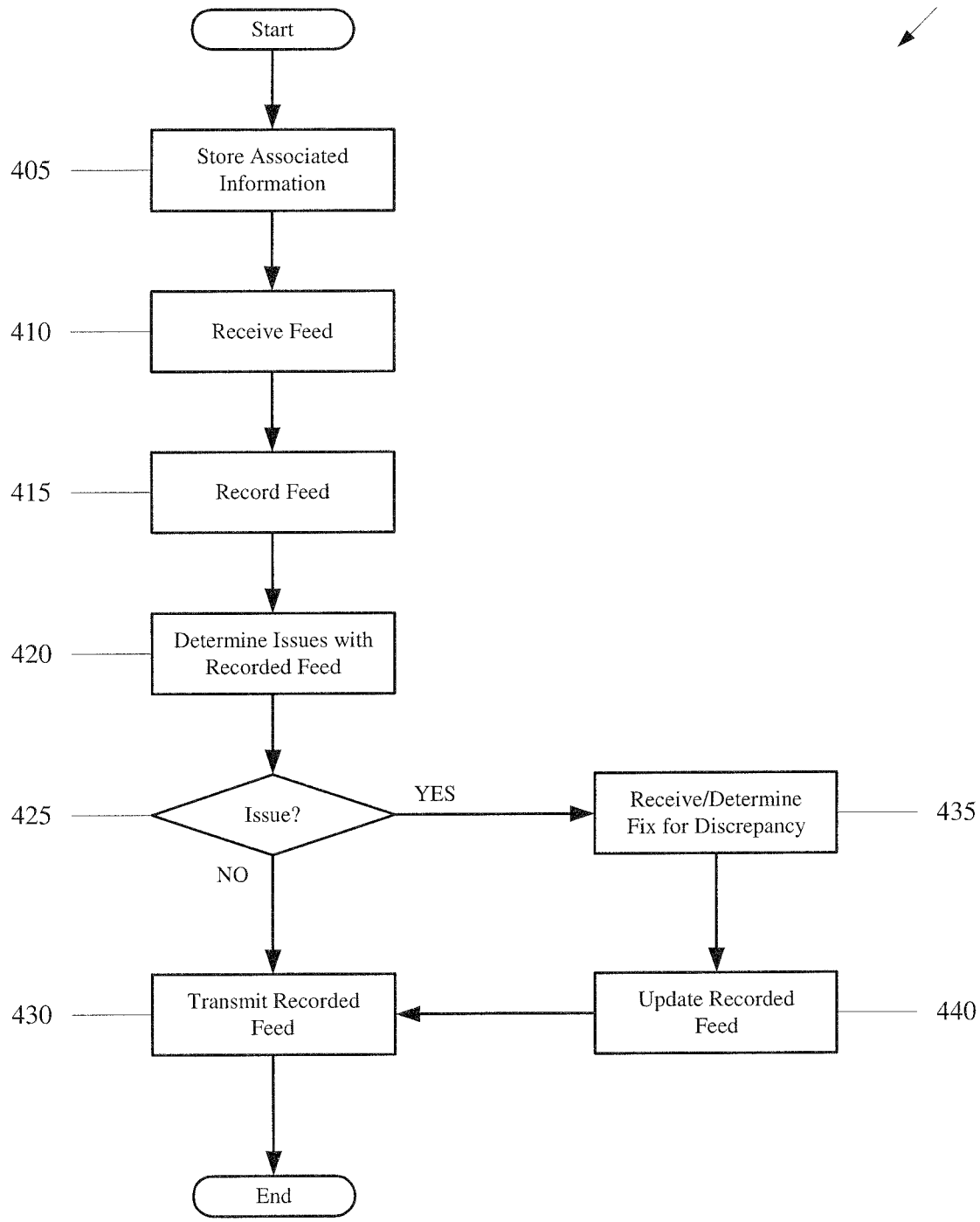
FIG. 4 shows an exemplary method for addressing issues in a playback feed according to the exemplary embodiments.

FIG. 4 shows an exemplary method 400 for addressing issues in a recorded feed according to the exemplary embodiments. Specifically, the method 400 relates to the above-described feature of the TDP system 100 in which the playlist source device 115 provides a fix for issues related to the recorded feed from the feed source 105. The method 400 will be described with regard to the TDP system 100 of FIG. 1. More specifically, the method 400 will be described wherein the TDP system 100 performs automatic functionalities as described above.

In step 405, the associated information for the east coast feed may be stored such that the devices (e.g., TDP device 110, playlist source device 115) may have access to the associated information. The associated information may be stored in the playlist database or other suitable storage location/device. As described above, the associated information may include scheduling of how a program is aired and when commercial breaks are aired including which commercials are to be aired at the respective commercial breaks and in which order (e.g., metadata).

In step 410, the TDP device 110 receives the feed from the feed source 105 (e.g., the east coast feed). In step 415, the TDP device 110 records and stores the feed from the feed source 105 as a recorded feed. As the TDP device 110 receives and records the feed, in step 420, it is determined if there are any issues with the feed. As described above, this determination may be made by the TDP device 110, the playlist source device 115 or any other device and/or component within the TDP system 100. As part of this determination, any errors may be recorded.

In step 425, it is determined whether any issues were identified in step 420. If no issues were determined, the method 400 continues to step 430 where the recorded feed is transmitted to the feed output 145 as the delayed playback feed. As indicated above, with no issues, the west coast feed will be an exact copy of the recorded east coast feed.

Returning to step 425, if it is determined that there is an issue with the recorded feed, the method 400 continues to step 435. In step 435, a fix for the determined issue or discrepancy is determined. As described above, the fix may be determined based upon pre-programmed instructions such as replacing the failed commercial with a replacement of the same commercial to be played in its entirety by retrieving this data from the playlist database. The identification of the commercial may be determined based upon the associated information that was stored in step 405. The result of the step 435 may be the correction blocks 263 and 267 described with reference to FIG. 2. In step 440, the recorded feed is updated to include the fixes and then the updated feed is transmitted as the west coast feed.

Returning to FIG. 1, the TDP system 100 is shown to further include a secondary TDP device 125. As discussed above, the exemplary embodiments may also address other issues such as those involving a failure of the components of the TDP system 100, particularly the TDP device 110. Thus, the TDP system 100 via the secondary TDP device 125 may be configured to provide a backup unit that runs in parallel with the TDP device 110 in a redundant fashion. Specifically, the parallel mechanism may relate to the recording phase to address an issue for the playback phase.

The exemplary embodiments provide the secondary TDP device 125 that is configured to be utilized as a backup for the TDP device 110. Furthermore, the TDP device 110 and the secondary TDP device 125 are configured to record and save the content from the feed source 105 in a manner that minimizes an amount of time that the TDP device 110 (i.e., primary device) is not being utilized because of an error with the TDP device 110 and to also maximize an amount of time that the secondary TDP device 125 is available for use as a backup.

According to the exemplary embodiments, the TDP device 110 and the secondary TDP device 125 may be configured to receive the feed from the feed source 105. More specifically, the TDP device 110 and the secondary TDP device 125 may receive the east coast feed. The TDP device 110 and the secondary TDP device 125 may save the east coast feed in small chunks that may be uniquely identified, for example, by a date and a time stamp. Thus, the east coast feed may be recorded by the devices 110, 125 in sequential increments. For example, the increments may be 10 second chunks.

By storing the recorded content in the sequential increments, the secondary TDP device 125 may be configured to provide missed content to the TDP device 110 if a failure were to occur, thereby allowing the TDP device 110 to be restored. For example, if the TDP device 110 fails and requires a reboot during a recording of the east coast feed, the TDP device 110 may be down for a period of time (e.g., 6 minutes). The TDP device 110 may determine missing recording using a periodic process in which an evaluation application may periodically review a set of recorded chunks based on names given to each chunk to recognize any missing recording chunks in the sequencing. For example, the chunks may be named in a numerical order (e.g., 817, 818, 819, 820, 821, etc.), in a date/time order (e.g., year (YYYY), month (MM), day (DD), hour (HH), minute (MM), second (SS), frames (FF) such as 20140731111071000). If the chunks that are stored include 817, 818, 820, and 821, then the evaluation application may easily identify that chunk 819 is missing.

Following the completion of a recording of each new chunk and/or as part of a periodic consistency check, the TDP device 110 may verify that each chunk is complete, undamaged, and/or not truncated. That is, the TDP device 110 may verify that the chunk is playable for the playback feed. Following this check, each chunk may be marked that the check has been performed thereon to avoid duplicate work on an ensuing scan although the next scan may still perform a further check to determine any corruption that may happen after recording such as due to a failing hardware component. If the chunk is missing or corrupt, the corresponding chunk may be received from the secondary TDP device 125. An alert may be provided to the system or operator indicating the missing or damaged chunks such as in a sequential manner (e.g., colored blocks with a first color indicating good chunks and a second color indicating bad chunks). The alert may also include other forms such as email, texts, etc. Thus, the entire east coast feed may be re-created from the content that was recorded prior to the failure, the content that was received from the secondary TDP device 125, and the content that was recorded after the failure. In this manner, the TDP device 110 may be placed back online in only the amount of time required for this action rather than based upon the amount of the time delay. For example, when only a reboot is needed, the TDP device 110 may be used again in only 6 minutes when 3 hours would otherwise be required because of the discontinuity of the recording.

It should be noted that the above process wherein the primary TDP device 110 receives missing chunks from the secondary TDP device 125 is only exemplary. Those skilled in the art will understand that a substantially similar process may occur wherein the secondary TDP device 125 receives chunks from the primary TDP device 110. This may ensure, for example, that the secondary TDP device 125 has a complete and valid set of recorded chunks in case the primary TDP device 110 fails.

It should be also noted that the mechanism described above may be performed in a different manner. For example, upon resuming operation, the TDP device 110 may run an evaluation application and determine a period of time that it has been down and an amount of time of the east coast feed that has not been recorded. Thus, the TDP device 110 may recognize that it has missed 6 minutes' worth of recording. The TDP device 110 may request or retrieve any missing chunks from the secondary TDP device 125. Meanwhile, the TDP device 110 may also continue recording the east coast feed. Accordingly, the entire east coast feed may be re-created.

It should also be noted that when the chunks are named with a date/time nomenclature, a shared time source may be used as a basis such as an incoming video timecode or a system clock rather than using a local clock of the respective TDP devices 115, 125. Those skilled in the art will understand that local clocks may drift (e.g., if not synchronized to a shared time source) such that a local time of, for example, 8:00:00.00 for the TDP device 115 may not exactly correspond to the exact same time on the TDP device 125.

It should be further noted the above description relates to content being missed from recording. However, when the TDP device 110 fails, there may also be truncated, damaged or missing content as well. Thus, the exemplary embodiments may relate to the TDP device 110 receiving corresponding content from the secondary TDP device 125 for any missed, truncated, and/or damaged content due to the failure of the TDP device 110.

It should also be noted that the secondary TDP device 125 may provide other functionalities. Specifically, if the TDP device 110 were to fail during a playback for the west coast feed, the secondary TDP device 125 may provide a backup and provide the playback for the west coast feed. Thus, the TDP system 100 of FIG. 1 also includes a connection to the feed output 145. As noted above, the secondary TDP device 125 may also receive any missing chunks from the primary TDP device 110. Thus, the secondary TDP device 125 may have a complete set of chunks for this functionality to be performed if necessary.

Figure 5:
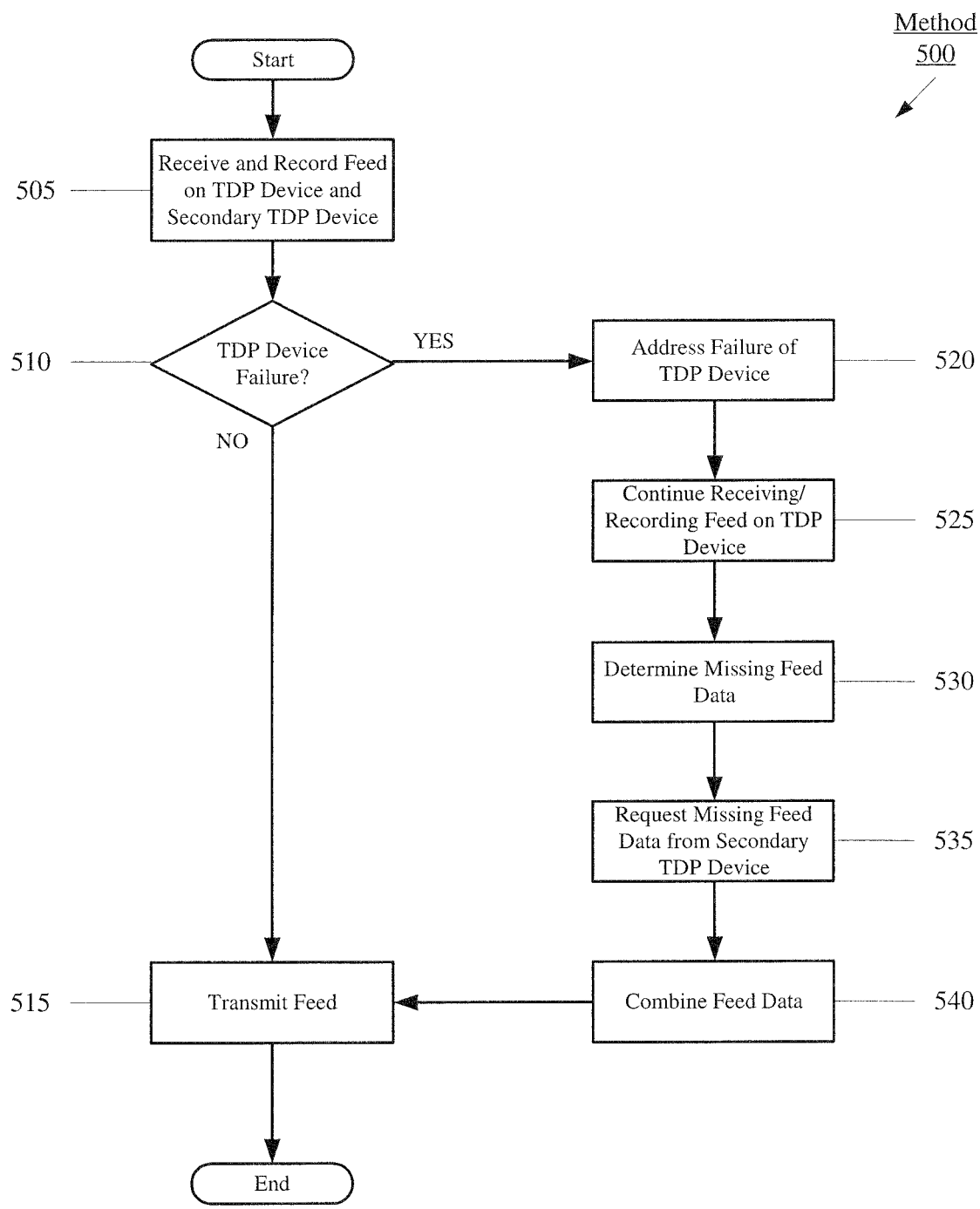
FIG. 5 shows an exemplary method for addressing issues in a recorded playback according to the exemplary embodiments.
Figure 6:
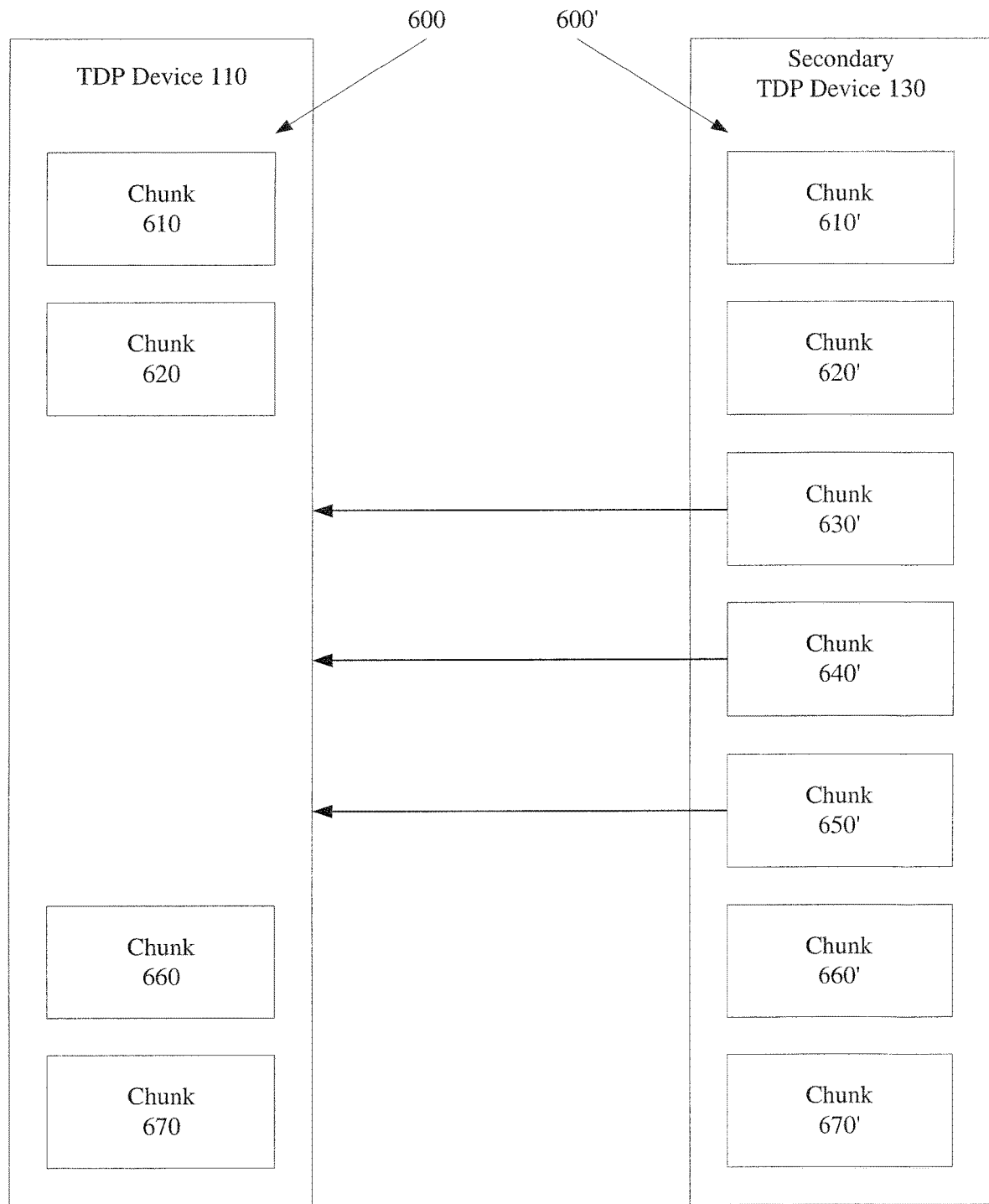
FIG. 6 shows an example of recorded chunks that are recorded by TDP time delayed playback devices.

FIG. 5 shows an exemplary method 500 for addressing issues in a recorded playback according to the exemplary embodiments. Specifically, the method 500 relates to the above-described feature of the TDP system 100 in which the secondary TDP device 125 provides recorded content that is missed from the TDP device 110 experiencing a failure. The method 500 will be described with regard to the TDP system 100 of FIG. 1 and the exemplary storage chunks for a recorded feed as shown in FIG. 6. It should be noted that the one way operation of the TDP device 110 failing and the secondary TDP device 125 providing the missed chunks is only exemplary. The mechanism may also operate in a reverse operation. In this manner, the TDP system 100 may include a main/backup switcher (hereinafter "main switcher) 140 that may control an operation between the TDP device 110 and the secondary TDP device 125 when the playback feed from the corresponding device is being utilized.

It should be noted that the TDP system 100 may include a fallback operation when the TDP device 110 and the secondary TDP device 125 both fail simultaneously to record a specific chunk. That is, the fallback operation may relate to when all recording devices simultaneously fail. When such a scenario occurs, a selected image (e.g., a black screen, a predefined or pre-stored still image, a predefined or pre-stored video content) may be played for the duration of the missed recording or chunk(s).

In step 505, the TDP device 110 and the secondary TDP device 125 may receive the feed from the feed source 105. Furthermore, the TDP device 110 and the secondary TDP device 125 may record the east coast feed in the above described manner in which increments of predetermined size and length are used as the basis of recording. In addition, each increment may be named with a date and time stamp (or any other manner of uniquely naming and sequencing the chunks) for the ordering to be maintained. It should again be noted that the naming of the chunks may be against a timing reference that is shared between both the TDP device 110 and the secondary TDP device 125.

FIG. 6 shows an example of recorded chunks 600 that are recorded by the TDP device 110 and recorded chunks 600' that are recorded by the secondary TDP device 125. In this example, it may be considered that the secondary TDP device 125 recorded the entire feed without any errors occurring at the secondary TDP device 125, e.g., the chunks 610'-670' represent the entirety of the feed that was to be recorded. In contrast, TDP device 110 experienced some type of failure such that it missed recording chunks after chunk 620 to chunk 660.

In step 510, it is determined whether there is a failure of the TDP device 110 or there are any missing or damaged chunks. For example, the TDP device 110 may have experienced an error (e.g., hardware and/or software) that causes the TDP device 110 to fail. In another example, a hard drive or memory chip may fail and records or provides incorrect data. If no such failure is detected during the time the feed is received, the TDP device 110 may continue the method 500 to step 515 in which the feed is transmitted as is recorded because it is a complete recording of the feed. More specifically, the TDP device 110 may be used for the playback in the west coast feed based upon the recording stored in the TDP device 110.

Returning to step 510, when the TDP device 110 experiences a failure, the TDP system 100 may continue the method 500 to step 520. As described above, in the example of FIG. 6, an error has occurred as evidenced by the missing chunks between chunk 620 and chunk 660. In step 520, the TDP system 100 addresses the failure of the TDP device 110. The failures may range from a problem that is small to a problem that is significantly large. For example, the problem may be one that may be addressed simply from a reboot. The TDP system 100 may include an automated component (not shown) that performs the reboot of the TDP device 110 and/or a user may perform the reboot. As such, a relatively small amount of time may be required to address the failure (e.g., 6 minutes). In another example, the problem may be a fatal one in which the TDP device 110 requires replacement. Thus, a user may replace a broken TDP device 110 with a functioning TDP device 110. In such a problem, a relatively large amount of time may be required to address the failure (e.g., more than 1 hour).

Once the failure has been addressed, in step 525, the TDP device 110 may continue receiving the feed from the feed source and record/store the feed. Referring to FIG. 6, the TDP device 110 recorded the chunks 610 and 620 prior to the failure. The failure occurred with missing chunks. The failure was addressed in step 520 and the TDP device 110 continued recording in step 525, thereby recording chunks 660 and 670.

In step 530, the TDP device 110 may run its evaluation application to determine the missing feed data during its downtime. For example, a sequence numbering name may be given for each chunk and an identification of any missing chunks within the sequence may be identified. In another example, when a reboot is required to address the failure, a time stamp of when the failure occurred and a time stamp of when the TDP device 110 came back online may be used as a basis to determine the missing feed data. In a further example, when the TDP device 110 is replaced, a user may enter a time stamp of when the failure occurred such that the missing feed data may be determined. It should also be noted that the previously stored feed data may still exist in a storage device such as a memory arrangement. In the current example, the TDP device 110 will determine that it is missing chunks between chunk 620 and chunk 660.

Once the missing feed data is determined, the TDP device 110, in step 535, may request this missing feed data from the secondary TDP device 125 that has also been receiving and storing the feed from the feed source 105. As shown by the arrows in FIG. 6, the secondary TDP device 130 will provide the TDP device with chunks 630', 640' and 650' that correspond to the missing chunks between chunk 620 and chunk 660. In step 540, the TDP device 110 may combine the feed data. For example, the feed data that was stored prior to the failure (e.g., chunks 610 and 620), the missing feed data that was received from the secondary TDP device 130 (e.g., chunks 630', 640' and 650'), and the feed data that was stored after the failure (e.g., chunks 660 and 670) may be combined into the desired playback for the west coast feed. Thus, the TDP device 110 may continue the method 500 from step 540 to step 515 to transmit the combined feed.

It should be noted that step 540 of combining the feed may relate to a different manner of providing the playback feed to the feed output 145. For example, the playback feed may simply be what is recorded and a schedule that identifies the source from which the chunks of the playback feed are to be received. In the above example, the schedule may indicate that chunks 610, 620 are received from the TDP device 110, chunks 630', 640', 650' are received from the secondary TDP device 125, and chunks 660, 670 are received from the TDP device 110. Such a manipulation mechanism may be performed by the main switcher 140. Therefore, an actual combining of the feeds to generate a single resulting feed is only exemplary and the combining may refer to combining the feed data to generate the one feed output 145.

The features of the TDP system 100 may also be used in conjunction. Specifically, the secondary playlist source device 130 may also be used with the secondary TDP device 125. As described above, the secondary TDP device 125 may be utilized when the TDP device 110 has a failure during a playback for the west coast feed. Thus, if there is an issue that arose in the east coast feed such as a commercial failing to play out followed by a subsequent failure in the TDP device 110, the secondary TDP device 125 may provide the playback for the west coast feed and utilize any fix provided by the secondary playlist source device 130 using the above described mechanisms.

The exemplary embodiments provide a system and method for a TDP system that receives and records a first feed at a first time such that a playback may be used in a second feed at a second time. Thus, after a delay corresponding to the difference between the first and second times, the recorded playback may be used. The system and method of the exemplary embodiments further provide mechanisms to address various issues that arise from using the TDP system. In a first example, the TDP system of the exemplary embodiments include a playlist source device that may provide a fix for issues arising in the recorded feed such as commercials failing to play out. Specifically, the fix such as a replacement commercial may overwrite the feed provided from the TDP device to a feed output. Thus, the commercial may play out successfully in the second feed although failing in the first feed. In a second example, the TDP system of the exemplary embodiments includes a secondary TDP device that may provide a backup component in order for missing content that failed to record on the TDP device may be received from the secondary TDP device. In this manner, the TDP device may still be used for playback in the second feed despite having otherwise missed content from being recorded.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
    recording as a first recording, by a first time delayed playback (TDP) device, a first feed broadcast at a first time to first viewers;
    receiving, by the first TDP device, a request for a fix corresponding to a discrepancy in a second recording of the first feed recorded by a second TDP device, the request indicating a time and a duration of the discrepancy;
    generating, by the first TDP device, the fix based on the first recording; and
    sending, by the first TDP device, the fix to the second TDP device, wherein the fix is configured to be inserted into the second recording at the time identified for the discrepancy and lasting for the duration identified for the discrepancy to create a second feed to be broadcast at a second time later than the first time to second viewers different from the first viewers.

2. The method of claim 1, wherein the request is received from a user.

3. The method of claim 2, wherein the fix is generated based on input received from the user.

4. The method of claim 1, wherein the request is received from the second TDP device that identified the discrepancy.

5. The method of claim 1, wherein the first feed and the second feed are for a television program including a plurality of commercials.

6. The method of claim 5, wherein the discrepancy includes a failure to play one of the commercials in a desired manner.

7. The method of claim 6, wherein the fix includes playing out an entirety of the failed commercial at the identified time lasting for the identified duration of the failed commercial.

8. The method of claim 1, wherein the first recording is a backup playback for at least a portion of the second feed.

9. The method of claim 1, wherein the first TDP device records the first feed in predetermined time length increments.

10. The method of claim 1, wherein the first feed is an east coast feed, the second feed is a west coast feed, and the predetermined delay is three hours.

11. A time delayed playback (TDP) device, comprising:
a memory; and
a processor configured to record as a first recording stored in the memory a first feed broadcast at a first time to first viewers, the processor configured to generate a fix corresponding to a discrepancy in a second recording of the first feed recorded by a second TDP device, the request indicating a time and a duration of the discrepancy,
wherein the fix is sent to the second TDP device, the fix being configured to be inserted into the second recording at the time identified for the discrepancy and lasting for the duration identified for the discrepancy to create a second feed to be broadcast at a second time later than the first time to second viewers different from the first viewers.

12. The TDP device of claim 11, wherein the request is received from a user.

13. The TDP device of claim 12, wherein the fix is generated based on input received from the user.

14. The TDP device of claim 11, wherein the request is received from the second TDP device that identified the discrepancy.

15. The TDP device of claim 11, wherein the first feed and the second feed include a television program including a plurality of commercials.

16. The TDP device of claim 15, wherein the discrepancy includes a failure to play one of the commercials in a desired manner.

17. The TDP device of claim 16, wherein the fix includes playing out an entirety of the failed commercial at the identified time lasting for the identified duration.

18. The TDP device of claim 11, wherein the first recording is a backup playback for at least a portion of the second feed.

19. The TDP device of claim 11, wherein the first TDP device records the first feed in predetermined time length increments.

20. A non-transitory computer readable storage medium with an executable program stored thereon, wherein the program instructs a microprocessor to perform operations comprising:
recording as a first recording a first feed broadcast at a first time to first viewers;
receiving a request for a fix corresponding to a discrepancy in a second recording of the first feed recorded by a second TDP device, the request indicating a time and a duration of the discrepancy;
generating the fix based on the first recording, and
sending the fix to the second TDP device, wherein the fix is configured to be inserted into the second recording at the time identified for the discrepancy and lasting for the duration identified for the discrepancy to create a second feed to be broadcast at a second time later than the first time to second viewers different from the first viewers.

* * * * *